Oct. 3, 1950
J. L. REIN
2,524,116
MIXING BOWL SCRAPER
Filed June 20, 1947
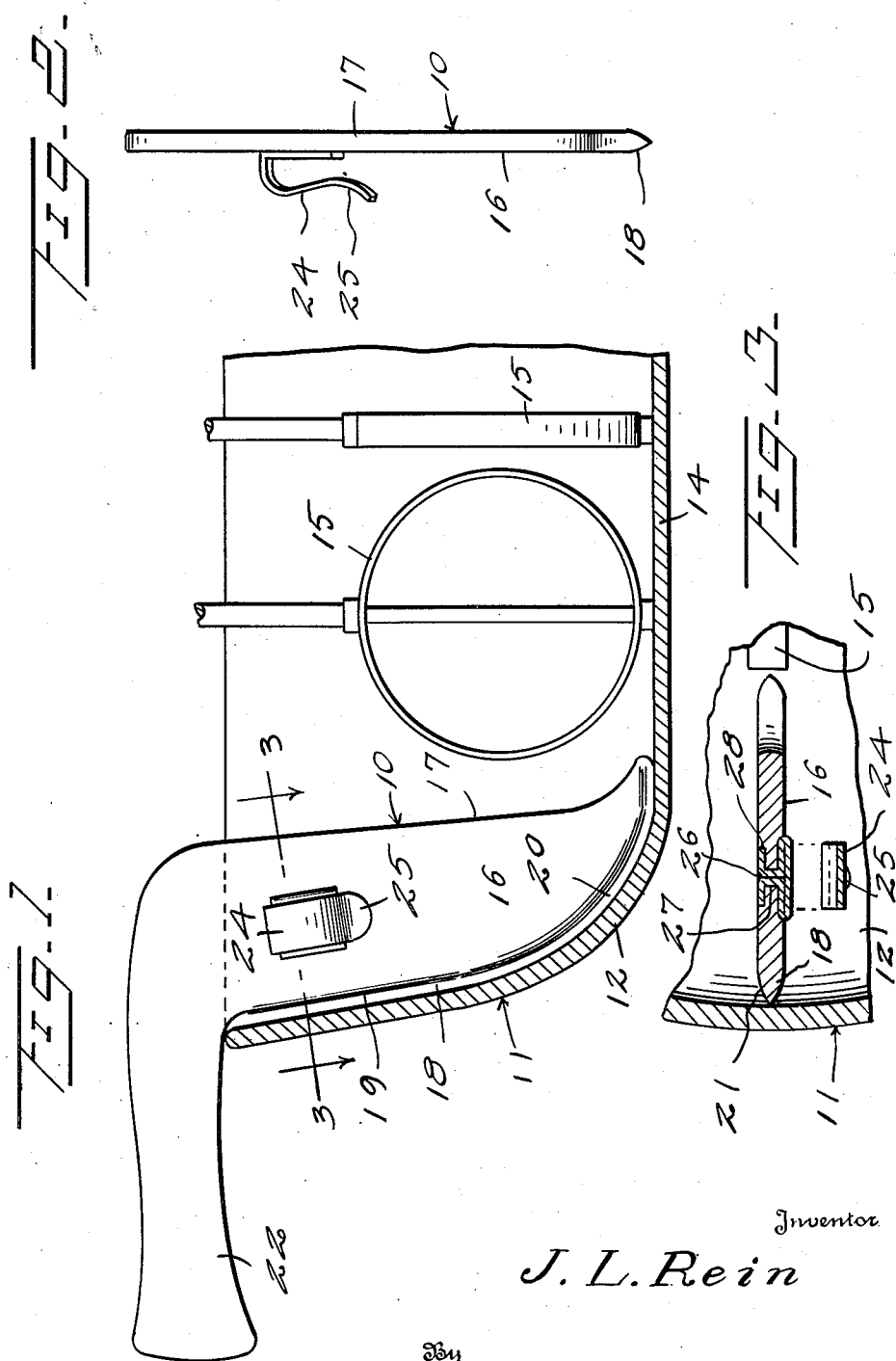
Inventor
*J. L. Rein*
By *Kimmel & Crowell* Attorneys Patented Oct. 3, 1950

2,524,116

UNITED STATES PATENT OFFICE 2,524,116

MIXING BOWL SCRAPER

Joseph L. Rein, Washington, D. C.

Application June 20, 1947, Serial No. 755,902

2 Claims. (Cl. 15—236)

This invention relates to scrapers and more particularly to a scraping device for mixing bowls and the like, for scraping the material from the inside walls of the bowl.

It is an object of this invention to provide a scraper of the kind to be more particularly described hereinafter which is particularly adapted for use with electric mixing and stirring devices having a bowl for holding the material to be mixed or beaten. As the electric beaters operate on the material in the center of the bowl, that material on the edges will stick to the bowl and will not be beaten as well as that in the center. With the use of the scraper constructed according to an embodiment of this invention, the material on the outer walls of the bowl will be scraped from the walls and deflected toward the center of the bowl and toward the beaters.

Another object of this invention is to provide a scraper of this kind having a scraping blade of the same contour as the contour of the inner wall of the mixing bowl and partially engaging the bottom or lower edge of the inside of the bowl to deflect the material adhering to the periphery of the bowl towards the beaters whereby a homogeneous mixture of material may be prepared.

With the above and other objects in view, my invention consists in the arrangement, combination and details of construction disclosed in the drawings and specification, and then more particularly pointed out in the appended claims.

In the drawing,

Figure 1 is a side elevation of a scraper constructed according to an embodiment of this invention, shown in engagement with the bowl of a mixer, the bowl being shown in section, Figure 2 is a front elevation of the scraper; and Figure 3 is a transverse section taken on the line 3—3 of Figure 1.

Referring to the drawing, the numeral 10 designates generally a scraper for removing material from the outer walls of a mixing bowl and directing the material in toward the center and toward the beaters suspended within the bowl.

The scraper 10 is designed primarily for use with any type of electric mixers and beaters known as a Mix Master, or any other type of mixers which have a bowl 11 formed with substantially vertical outer walls, and an arcuate lower edge 12 between the outer walls and the bottom 14. The bowl 11 is supported on the mixing device in such a manner that beaters 15 are disposed in the center of the bowl.

The beaters 15 are electrically operated by a motor fixedly supported above or adjacent to the bowl 11. In the normal use of such beaters, the material is placed in the bowl and the beaters set in operation until the material is thoroughly mixed or beaten. As the beaters 15 are disposed in the center of the annular bowl 11, the material which remains along the walls outwardly of the beaters 15 is not mixed as well as that in the center. It is an object of this invention to provide a scraping tool which may be held in contact with the inside surface of the vertical walls of the bowl 11 for scraping any material from the walls and directing it inwardly towards the center of the bowl and toward the beaters 15.

The scraping tool 10 is formed with an elongated blade 16 having an inner edge 17 which is substantially straight and vertical for a major portion of the length thereof and is formed with an inwardly extending arcuate hooked portion at the bottom thereof and a contoured outer scraping edge 18. The scraping edge 18 is substantially straight and vertical near its upper end as designated by 19, and arcuate and turned inwardly at its lower end as at 20 to fit the contour of the wall of the bowl 11 and provide a hooked portion partially overlying the bottom 14.

The scraping edge 18 may be sharpened nearly to a point, as shown in Figure 3 and designated by the numeral 21. The lowermost end of the scraping blade 16 is turned inwardly providing a hooked portion for partially overlying the bottom wall 14 of the bowl 11 and being in complete engagement with the corner formed by the joining of the bottom 14 and the side wall of the bowl 11.

A handle 22 is fixed to or formed on the upper end of the blade 16 and extends at substantially right angles to the axis of the blade 16 for extending outwardly from the bowl 11. The handle 22 may be held by an operator in alignment with the radius of the annular bowl 11 for supporting the blade 16, perpendicular to the walls.

For supporting the scraper 10 when not in use, a spring clip 24 is fixed to the side of the blade 16. The spring clip 24 is formed of a flat resilient strip of metal bent upon itself to form a downwardly extending hook 25 spaced slightly outwardly from the side of the blade 16. The clip 24 is fixed to the blade 16 by ears 26 which engage through an opening 27 in the blade 16 and are reverted as at 28 on the opposite side thereof.

I do not mean to confine myself to the exact details of construction herein disclosed, but claim all variations falling within the purview of the appended claims.

What I claim is:

1. A mixing bowl scraper comprised of a flat blade having two opposite edges, one of which is adapted to contact the inner wall of a mixing bowl formed with a downwardly sloped inner wall terminating in a centered flat bottom area, said one edge comprising a straight upper portion merging into a convex intermediate portion which in turn merges into a straight bottom portion which is formed approximately at right angles to said upper portion, the other edge of said blade is formed with an upper end portion formed straight and approximately parallel to the straight upper portion of said one edge and extending appreciably below the juncture of the upper and intermediate portions of said one edge, the straight portion of said other edge merging into a lower concave portion which in turn merges with the straight bottom portion of said one edge to form a point disposed laterally from the upper straight portion of said other edge.

2. A mixing bowl scraper comprised of a flat blade having two opposite edges, one of which is adapted to contact the inner wall of a mixing bowl formed with a downwardly sloped inner wall terminating in a centered flat bottom area, said one edge comprising a straight upper portion merging into a convex intermediate portion which in turn merges into a straight bottom portion which is formed approximately at right angles to said upper portion, the other edge of said blade is formed with an upper end portion formed straight and approximately parallel to the straight upper portion of said one edge and extending appreciably below the juncture of the upper and intermediate portions of said one edge, the straight portion of said other edge merging into a lower concave portion which in turn merges with the straight bottom portion of said one edge to form a point disposed laterally from the upper straight portion of said other edge, and a handle attached to said blade approximately at right angles thereto, said handle being formed with an under surface disposed from said one edge of the blade for engagement with a top edge of the bowl in which the blade is inserted.

JOSEPH L. REIN.

REFERENCES CITED

The following references are of record in the file of this patent:

UNITED STATES PATENTS

| Number | Name | Date |
|---|---|---|
| 101,209 | Babcock | Mar. 29, 1870 |
| 161,890 | Manning | Apr. 13, 1875 |
| 164,880 | Shelton | June 22, 1875 |
| 436,479 | Hise | Sept. 16, 1890 |
| 919,668 | Williams | Apr. 27, 1909 |
| 1,192,910 | Lawrence | Aug. 1, 1916 |
| 1,401,457 | Beuckmann | Dec. 27, 1921 |
| 1,579,495 | Stroud | Apr. 6, 1926 |
| 1,605,007 | Smith et al. | Nov. 2, 1926 |
| 2,065,886 | Clift | Dec. 29, 1936 |